United States Patent [19]
Bonnema et al.

[11] Patent Number: 5,857,262
[45] Date of Patent: Jan. 12, 1999

[54] CORDLESS HYDROCARBON FUEL HEATED HAIRDRYER

[75] Inventors: James Bonnema, Middleton; Steven Shapiro, Weymouth; Karl Winkler, Waltham, all of Mass.

[73] Assignee: The Schawbel Corporation, Boston, Mass.

[21] Appl. No.: 752,061

[22] Filed: Nov. 19, 1996

[51] Int. Cl.[6] .................................................. A45D 00/00
[52] U.S. Cl. .............................. 34/97; 431/344; 126/409
[58] Field of Search .................................. 34/96, 97, 98, 34/100; 431/344; 126/404, 407, 409, 414

[56] References Cited

U.S. PATENT DOCUMENTS

| | | | |
|---|---|---|---|
| 4,555,232 | 11/1985 | Raccah et al. | 432/222 |
| 4,635,382 | 1/1987 | Bourdeau | 34/97 |
| 4,800,654 | 1/1989 | Levin et al. | 34/97 |
| 4,903,416 | 2/1990 | Levin et al. | 34/97 |
| 4,924,849 | 5/1990 | Zabrowski | 126/409 |
| 5,155,925 | 10/1992 | Choi | 34/97 |
| 5,608,975 | 3/1997 | Hsu | 34/97 |

*Primary Examiner*—Henry A. Bennett
*Assistant Examiner*—Steve Gravini
*Attorney, Agent, or Firm*—Levisohn, Lerner, Berger, & Langsam

[57] ABSTRACT

A cordless, hydrocarbon fuel powered hairdryer. The invention incorporates a novel electronic control system which evaluates the thermal and electrical conditions within the hairdryer during its operation. Two fuel flow valves are provided. The first fuel flow valve is mechanically actuated and opens and closes the valve in the hydrocarbon fuel cartridge. The second fuel flow valve is a solenoid valve that cannot open without a predetermined voltage being supplied. Application of the predetermined voltage will allow gas to flow through this second valve and into the area where the fuel is ignited. Only when both valves (the mechanical and the solenoid) are open, can fuel flow. A microcontroller monitors the temperature conditions in the combustion area, and controls system conditions such as power to the solenoid valve and to the fan motor to prevent uncombusted gas from building up and presenting a safety hazard.

19 Claims, 12 Drawing Sheets

CORDLESS HYDROCARBON FUEL HEATED HAIRDRYER

FIELD OF THE INVENTION

The present invention relates to a cordless, fuel heated hairdryer. The hairdryer is hydrocarbon powered and presents significant safety advantages over the prior art.

BACKGROUND OF THE INVENTION AND DESCRIPTION OF THE PRIOR ART

The concept of a hydrocarbon cordless hairdryer has been known for many years. Yet, although the concept itself is not new in the art, practical design and effective implementation of the concept in a working embodiment has been problematic. Heretofore, the embodiments proposed in the art have generally presented important safety flaws. The safety considerations in a device of this nature arise from the necessity for regulation and control of a very high flow rate of fuel (approximately 30–50 g/hr) in a careful fashion to prevent any dangerous conditions arising for the consumer. The fuel must be combusted completely within the device without sparks activating fuel outside desired areas, and without flames escaping from the device. To prevent fire and explosion hazards, the exhaust gases must be maintained at a temperature which is cooler than the ignition temperature of combustible mixtures of air and common household solvents or natural gas. At the same time, for the product to be effective, to promote good hair drying without causing hair damage, the temperature of the exhaust when it leaves the dryer should be approximately 80° C.

Safety problems are also introduced by misuse of the device. One anticipated misuse for example is that users could turn the gas on but not ignite it, or occasionally could cover the exhaust or intake openings causing flame outs. Whenever fuel flows but is not burnt, the flow of gas must be interrupted before hazardous explosive levels of gas accumulate outside of the hairdryer, presenting the possibility of inadvertent explosion. Similarly, the fuel flow must also be interrupted in cases of overheating. Overheating results from reduced air flow through the dryer. This can be caused by discharged fan motor batteries, by debris on the intake or exhaust grill interfering with the free flow of air, by debris on the axle of the motor causing binding, by a wornout motor, or by intake or exhaust areas which are significantly occluded by the user's hair or by other objects which lodge during normal use.

In addition, the fuel feed system must have the means available to evaporate desirable quantities of fuel (preferably butane) and to feed only vapor to the combustion area. Although the use of propane could overcome this problem, propane cartridges have to be of costly construction to conform with DOT regulations.

Accordingly, there is a need for a hydrocarbon fuel, cordless hair dryer which overcomes the safety problems that are prevalent within the prior art.

SUMMARY OF THE INVENTION

The present invention overcomes the safety problems in the prior art by incorporating a novel electronic control system which evaluates the thermal and electrical conditions within the hair dryer during its operation. The hairdryer functions using a flame-arrested combustion system. In the device, the electronic control and the fan motor are powered by the same batteries (e.g., four M rechargeable Nicad cells in series). The hair dryer is designed so that fuel will not flow unless the battery pack is installed and has adequate voltage for safe operation.

The hairdryer is specifically designed to overcome the safety problems that have been prevalent in the prior art, especially the problems associated with a buildup of unsafe levels of unignited gas. This is accomplished by having two fuel flow valves in the circuit. The first fuel flow valve is mechanically actuated, and is combined with a pressure regulator and opens and closes the valve in the cartridge. It operates substantially in the same manner as described in our prior patent, U.S. Pat. No. 4,699,123 to Zaborowski (issued Oct. 13, 1987), which is incorporated herein by reference. Such mechanical valves are embodied in our Schawbel Thermacell curling irons, which are currently available on the market from the Schawbel Corp. (Boston, Mass.). Our numerous patents relating to portable heating appliances include U.S. Pat. No. 4,733,651 (issued to Schawbel on Mar. 29, 1988), U.S. Pat. No. 4,759,343 (issued to Schawbel on Jul. 26, 1988), all of which are incorporated herein by reference.

The second fuel flow valve is a solenoid valve that cannot open without a predetermined voltage being supplied. Application of the predetermined voltage will allow gas to flow through this second valve and into the area where the fuel is ignited. The same switch lever which operates the mechanical valve operates an electrical switch in the solenoid circuit. Only when both valves (the mechanical and the solenoid) are open, can fuel flow.

In addition to the two valve system, further safety features are provided to protect the user, as well. After flowing through the second valve, air is entrained in the fuel flow ignition by directing the jet of gas through an orifice (which is otherwise blocked by the second valve) into a venturi, to entrain surrounding air. This air fuel mixture can be ignited when the user activates a piezoelectric ignitor. The microcomputer within the hairdryer senses when the fuel switch is on, and measures the temperature in the combustion area. If the temperature increases, the microcomputer is programmed to turn the fan motor on and to signal normal running by illuminating an LED. If the temperature fails to increase, the solenoid valve will close and the fuel flow will be turned off, after the elapse of a predetermined period of time. In that case, the fan motor will not be energized, and an LED signals to the user that ignition has failed to occur. Consequently, fuel will not be continually delivered to the combustion area in the absence of ignition.

If ignition occurs, on the other hand, the system continues to monitor the temperature in the combustion area. If combustion is interrupted for any reason, the temperature in the combustion area will fall. When the circuit detects a falling temperature, it will close the solenoid valve to interrupt the fuel flow, will shut off the fan, and will signal that a flameout has occurred. In other words, even if the gas properly ignites, the system continually monitors the temperature in the combustion area to address later problems, should they occur. Thus, if the flame goes out at some point after the gas has ignited, the solenoid valve is closed to quickly shut off gas flow.

The system uses a thermistor to monitor temperature change, for reasons of cost. This device is not sufficiently precise, however, on its own. Consequently, a second temperature measuring device, a simple mechanical thermostat, is used to determine if a predetermined temperature is exceeded in the combustion area. If overheating occurs, the microcontroller detects that the thermostat has opened, and in response, closes the solenoid valve thereby shutting off the fuel flow. Normal operation is restored when the thermostat recloses.

If the battery pack is attached but the voltage is too low for safe operation, the low voltage condition is detected by the circuit and an LED is lit to inform the user of this condition.

With respect to thermal protection, the regulator adjusting screw will deform and become dislodged from heat if the thermostat fails to operate. This will close the mechanically operated gas valve and will permanently disable the dryer.

DETAILED DESCRIPTION OF THE INVENTION AND THE PREFERRED EMBODIMENT

As described above, and as further set forth below, the present invention overcomes the safety problems in the prior art by evaluating the thermal and electrical conditions within a hydrocarbon powered hair dryer during its operation, and by providing two fuel flow valves in the circuit to provide a fail-safe against buildup of dangerous levels of gas. The first fuel flow valve is mechanically actuated, and is combined with a pressure regulator which opens and closes the valve in the cartridge. The second valve cannot open without a predetermined voltage being supplied. The same switch lever which operates the mechanical valve operates an electrical switch in the solenoid circuit. Only when both valves (the mechanical and the solenoid) are open, can fuel flow. In addition to the two valve construction, a microcontroller is provided so that the hairdryer continually monitors system conditions and responds to potential safety problems.

The construction of the unit will be further understood with reference to FIGS. 1a–4.

Figure 1B:
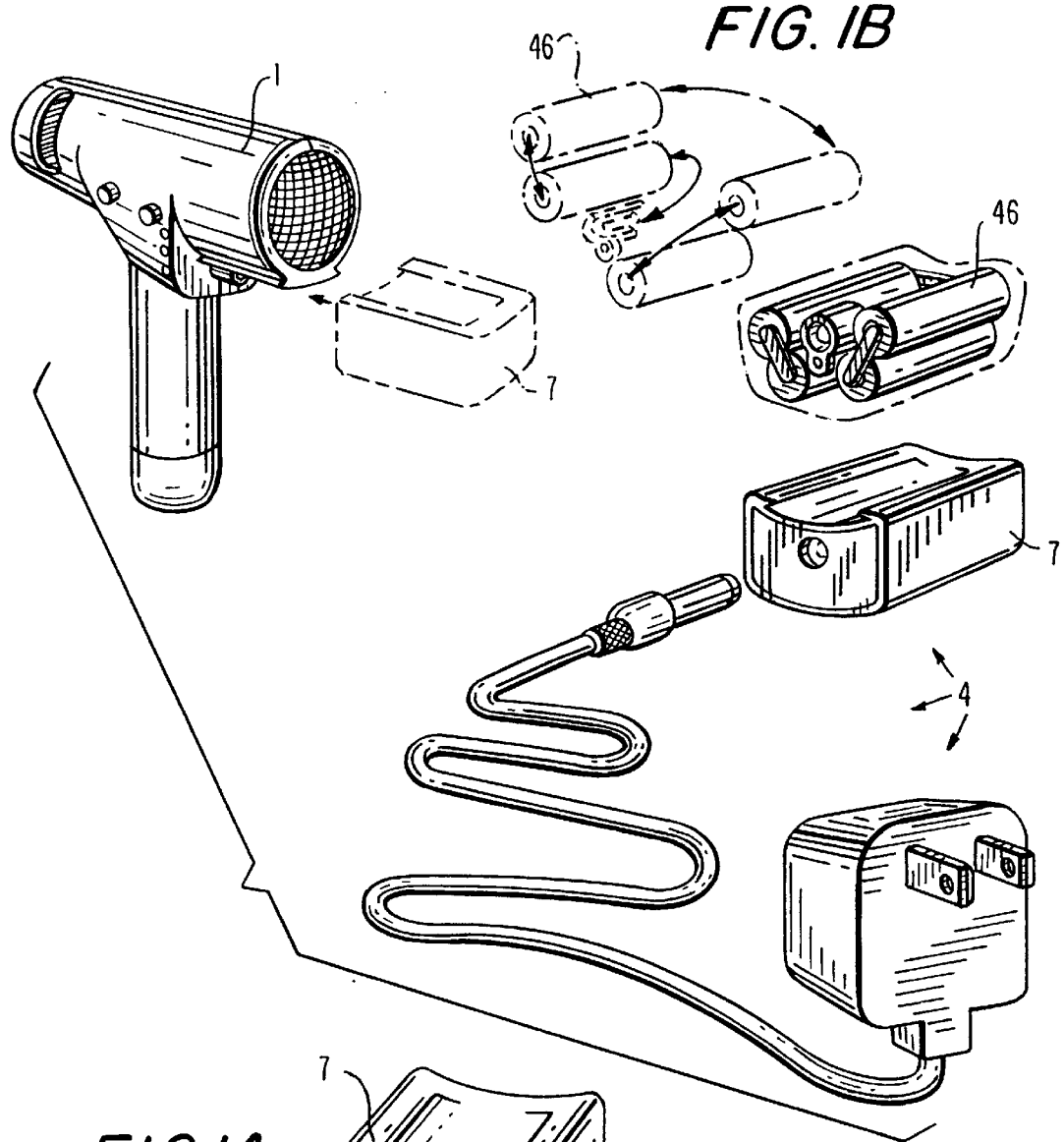
FIGS 1a and 1b are rear, left and top perspective views showing the hairdryer of the present invention, with a battery pack of rechargeable batteries being inserted.
Figure 1A:
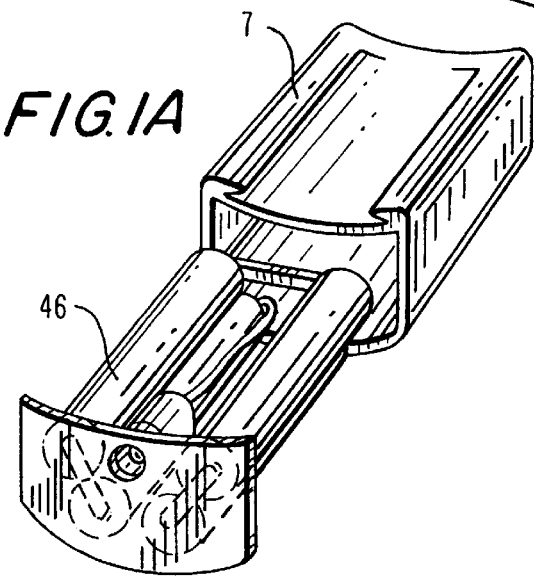
Figure 2:
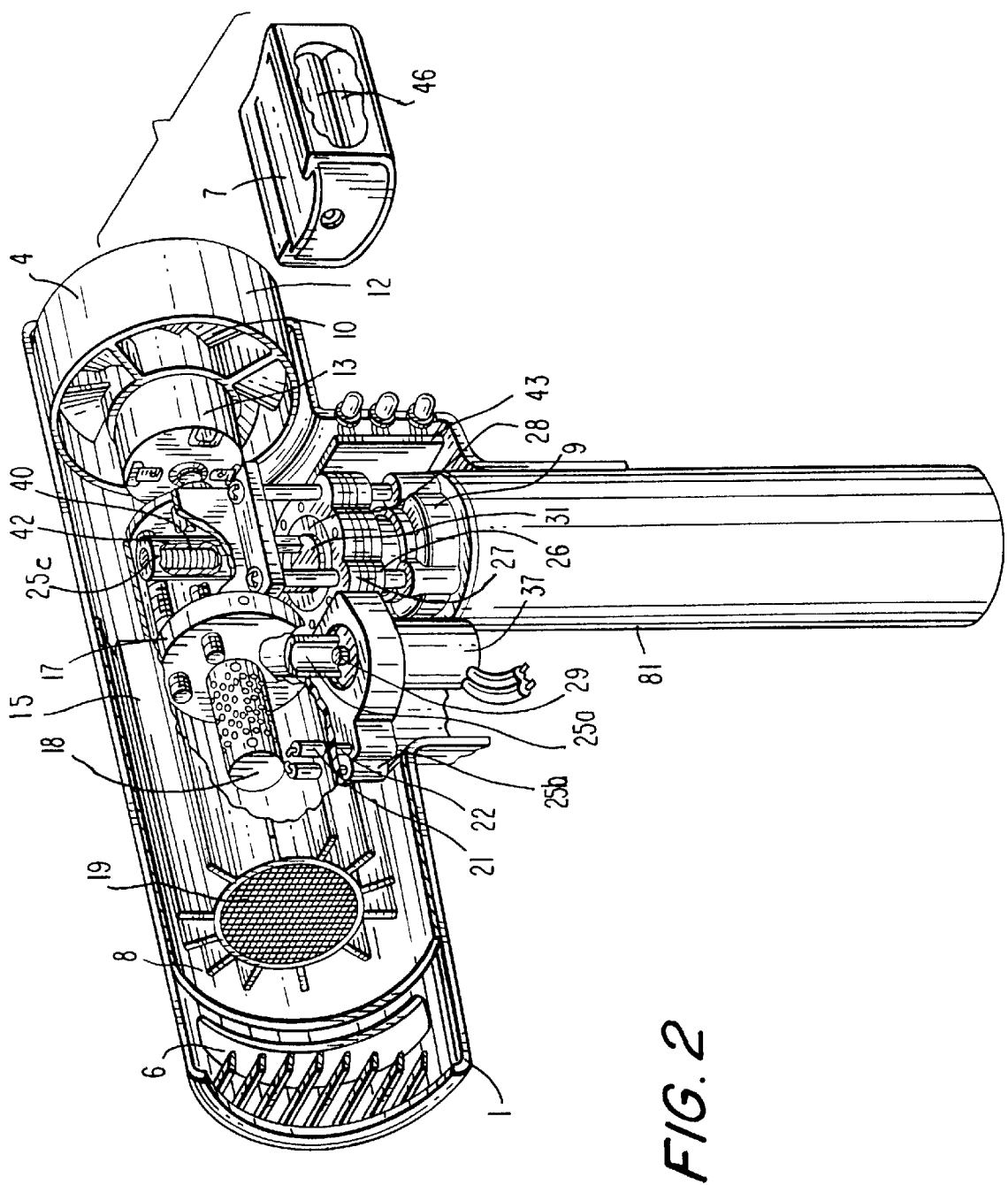
FIG. 2 shows a front, left and top perspective sectional view of the hairdryer, in accordance with the present invention.

As shown in FIG. 2, a sectional side perspective view of the hairdryer is provided in accordance with the current invention. Generally speaking, the hairdryer is constructed of a housing, a fan, a heat exchanger, an ignitor assembly, a regulator, an operator, a switch and electronics.

The housing of the unit is constructed of two shells, preferably plastic, an assembly half shell 1 and a cover half (removed for clarity in FIGS. 2–4) which is the assembly half shell's mirror image. The interior of the shell is preferably covered with a mica heat shield sleeve 8. In the preferred embodiment, the assembly half shell 1 and cover half shell are made of polycarbonate.

An intake screen 4 is provided to allow the flow of air into the back of the hairdryer and an exhaust grill 6 is provided for the exit of air from the front. Air is thus drawn into the back of the hair dryer, heated within by passing over the heated heat exchanger's fins, and blown out of exhaust grill 6 to dry the user's hair. The intake screen is supported by a screen support frame (not shown). The exhaust grill and screen support frame are preferably made of steel, and the intake screen is preferably made of steel or is molded.

The unit 1 is powered by portable battery power. Preferably, 4 rechargeable M batteries (500 mA Hr) are utilized as the power source. The batteries 46 are housed in a cartridge/battery cover 7. The cartridge/battery cover 7 is preferably made of polycarbonate. The cartridge 7 slides into the hairdryer unit 1 as shown in FIG. 2, and similarly illustrated in FIGS. 1a & b. A rechargeable battery pack 4 (a low cost, 14 hour rate model) is employed to recharge the batteries. The battery pack is partially shown in FIG. 1b.

The unit has three LEDS, a red LED, a yellow LED, and a green LED. Each LED has three possible states: on, off, or flashing on. The state of the LEDs indicates to the user the internal conditions within the hairdryer, as discussed in further detail below.

A fan assembly is provided in the unit to draw the air in through intake screen 4. The fan assembly is constructed of a fan 10, having a fan hub of ordinary construction (not shown), the fan being encased in fan shroud 12. The fan is driven by motor 13 which is driven by the batteries of battery pack 7. In the preferred embodiment, the motor is a Mabuchi RS-380PH-4045, CCW or the equivalent.

Gas flow into the canister having orifice 29 is controlled by a mechanical switch (i.e. the regulator assembly) and a solenoid 37. Gas is initially contained in cylinder C-30, a gas canister selectively attached to the bottom of the unit. Preferably, butane is used. There are various approaches to providing a high flow of gaseous fuel. Presently, the dryer uses the Schawbel C-39, a 26 g capacity butane cartridge (available from the Schawbel Corporation, Boston Mass.). It has a storage system which depends on the liquid butane being adsorbed into fiber batting fitted within the cartridge. Once adsorbed, the butane can only be given up as a gas. The mechanical on-off switch and the regulator operate as in the Schawbel Thermacell curling irons, described in U.S. Pat. No. 4,699,123 to Zaborowski, the disclosure of which is incorporated herein by reference.

This is a simple approach, functionally, although the special cartridge can be costly. An alternative approach, is to use two stages of regulation. In this approach, the vaporization duties are divided between two regulators which takes advantage of the heat available at two locations instead of one. In that case, the first stage regulator would be in combination with the on-off switch and would operate as in the Schawbel Thermacell curling irons. A yet third approach would be to provide a combination of a pressure regulator with a flow restrictor (like a membrane filter or a porous plug) which would work as in the 12 g ThermaCell cartridge (also available from the Schawbel Corporation) with the vaporatizer enlarged to increase its capacity.

The gas provided by the cartridge flows through a regulator, which assures an appropriate, constant, pressure of gas flow (preferably, approximately 40 psi). The regulator is the same as disclosed in our previous patent, U.S. Pat. No. 4,699,123 to Zaborowski (issued Oct. 13, 1987). The teachings of that patent are incorporated herein by reference. The regulator assembly provides vaporized fuel at a constant temperature independent of ambient temperature, fuel consumption rate, orientation, brand of fuel or fuel level.

Figure 3:
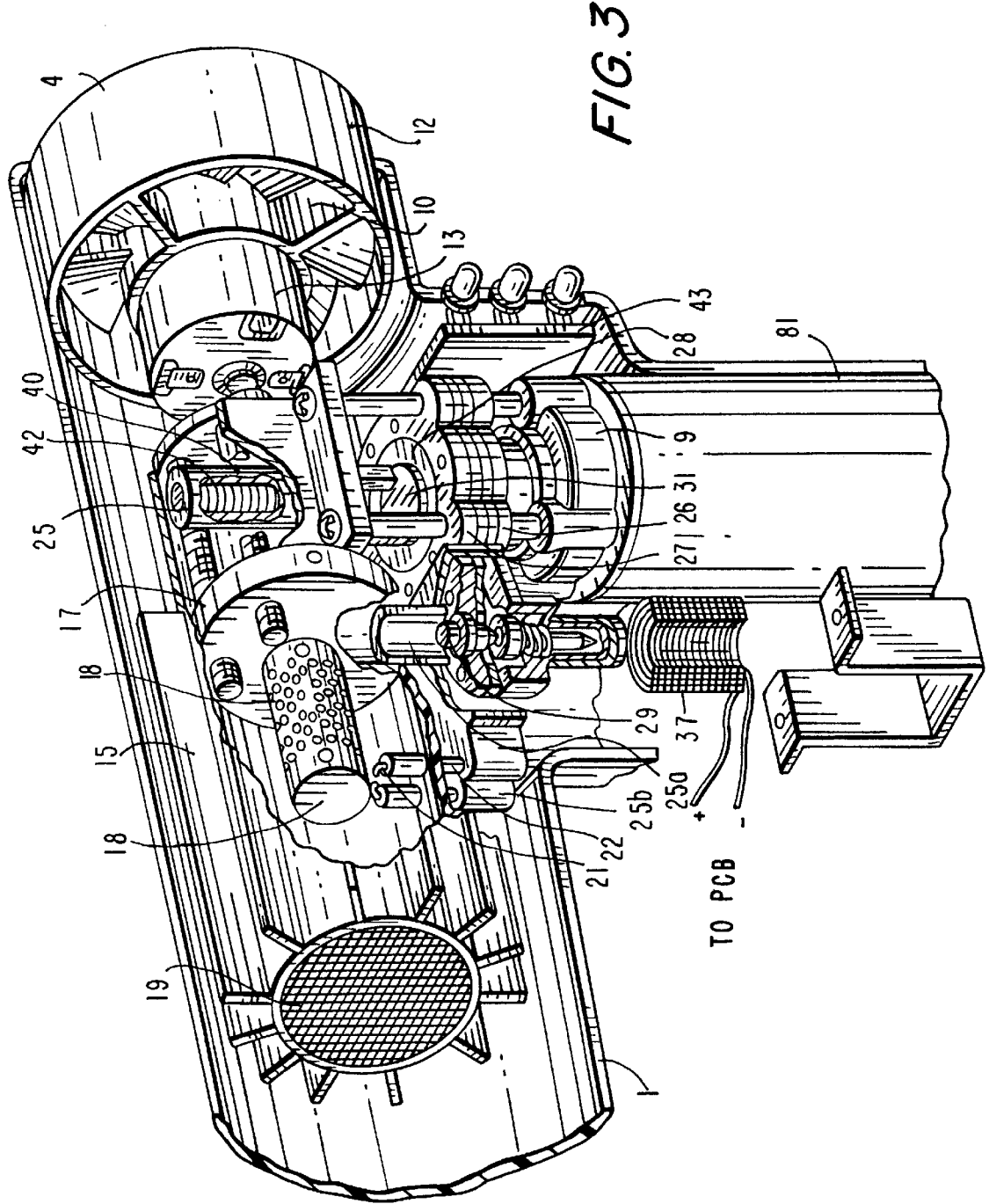
FIG. 3 shows an enlarged partial sectional view as in FIG. 2, showing the solenoid valve assembly exploded for further detail.
Figure 4:
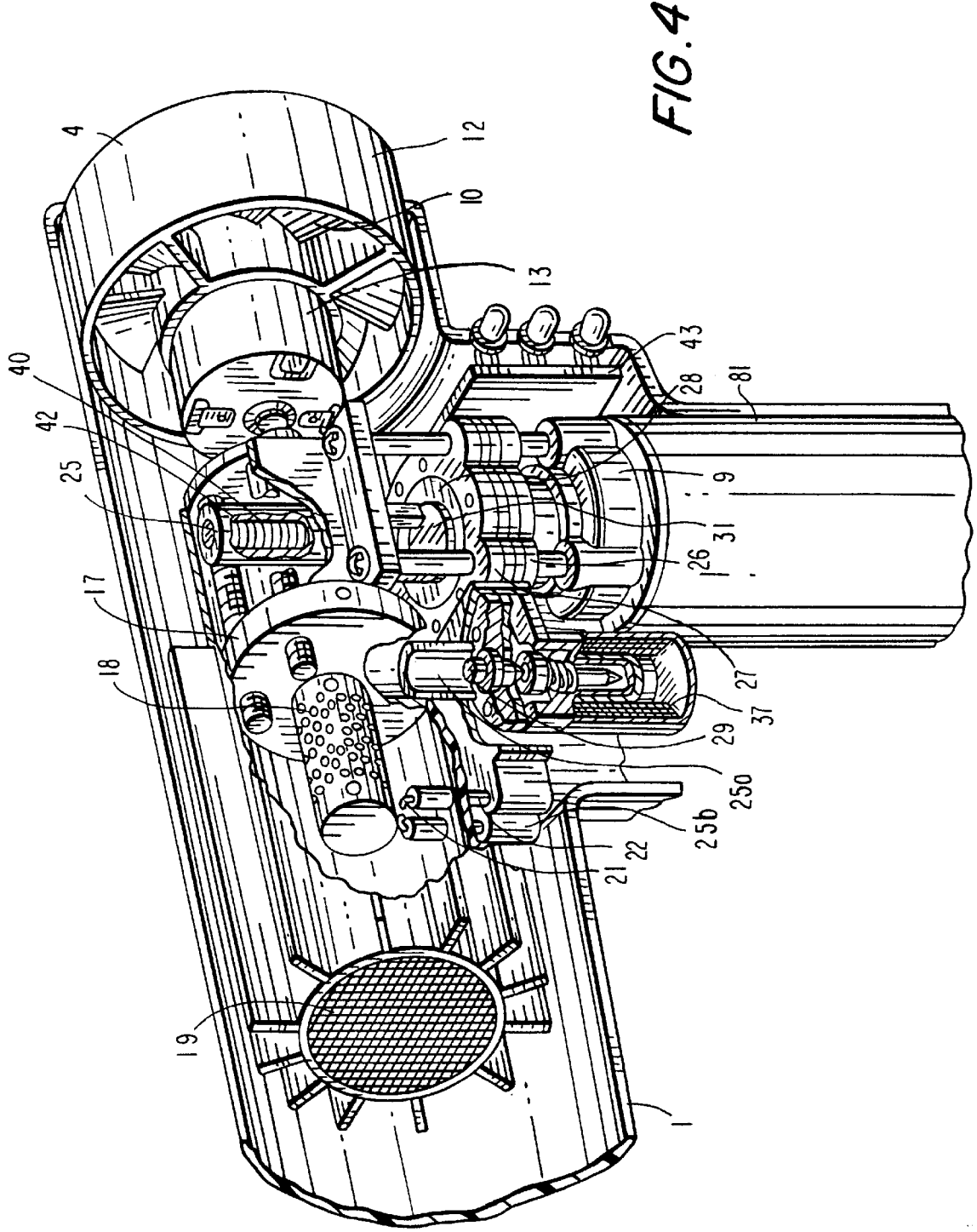
FIG. 4 shows a sectional view as in FIGS. 2 and 3, with the solenoid valve fully assembled.

After flowing through the regulator assembly, the fuel flows into the operator assembly. The operator assembly includes the solenoid valve described above, which acts as a second regulator of fuel flow. A metal plunger is provided (see FIGS. 3 and 4) within this regulator, with a coil 37 (45 ohm) outside. Normally, the plunger is biased upward, keeping the valve in the closed position. When sufficient current is provided to coil 37, however, the electromagnetic field generated by the coil retracts the plunger, allowing the valve to open and gas to flow through orifice 29. As shown in FIG. 3, it is preferred that an operator cover be provided which is a ferrous metal bracket (1.0 mm THK) used to improve magnetic performance.

The above two valves are thereby used to direct gas from the gas canister to exit through orifice 29 into venturi 25a. Venturi 25a is a cylinder having holes at its base for the entry of air into the venturi. Venturi 25a is concentric about orifice 29.

When both valves are open, gas exits orifice 29 at a high velocity into the interior of the venturi 25a. In the venturi 25a, the high velocity gas entrains air into the gas stream. The gas and air mix to form a stream having approximately 30 times more air than butane. This mixture exits out of a small hole in the top of the venturi 25a, and is channelled into rear heat shield 17, and then into burner tube 18.

Burner tube 18 is provided with a burner screen (not shown). The burner screen is a woven cylindrical metal screen (i.e. a metal mesh having small holes therein), which is located immediately within and lining the burner tube 18. The gaseous stream enters the burner tube 18 and exits out of the burner tube through holes in the burner tube 18, as shown in the Figure. The burner screen lining the inside of the burner tube 18 functions to disperse the gas evenly around the holes. Gas thus flows out through the holes of the burner tube and into the ignition and combustion area.

To ignite the gas, outside of the burner tube 18, an ignitor assembly is provided. The assembly is a piezoelectric igniter as is commonly found in many cigarette lighters. A piezoelectric crystal (not shown) is connected to two electrodes 21, each of which is partially covered by a ceramic tube 22. The electrodes 21 are provided in proximity to the burner tube 18, with the tips of electrodes 21 partially protruding from the ceramic tubes 22. When the ignition push button is pressed, a spring loaded hammer hits the piezoelectric crystal, which generates a brief current to the electrodes 22. As a result, a spark jumps across the junction between the electrodes 22. This spark ignites the gas flowing out of burner tube 18. Consequently, the gas begins to burn in the area outside the burner tube 18, with flames surrounding the burner tube 18.

The burning gas generates a large degree of heat, which heats the air flowing through the hairdryer. The flow of air is heated as it flows by the heat exchanger 15. Driven by the fan, air flows from outside the hairdryer, into the intake screen 4, through and past the fins of the heat exchanger 15 and out through exhaust grill 6, to be directed at the user's hair. Exchanger 15 is a cylindrical structure (preferably an aluminum extrusion) with radial fins to evenly conduct heat to the flowing air. Flame arresting screen 19 cools the gas/air stream from the combustion area to reduce its temperature by conduction, as is conventional within the art. This is necessary to reduce its temperature below a temperature which would ignite common household solvents or natural gas.

The electrical operation and safety mechanism of the hairdryer is described in further detail below. The features of the circuit board are listed, and the operation of the firmware is detailed. In addition, logic flowcharts are provided to illustrate the sequence of events in the firmware.

The purpose of the electronics is to monitor the temperature of the burning gas or combustion area in the hairdryer, and to control both the fan and the regulation of the gas supply to the flame accordingly. Since a microcontroller is used to implement these features, a more comprehensive user interface is made possible as well.

The operation of the microcontroller can further be understood by reference to FIG. 5, and FIGS. 6–10 which diagram the inputs to and outputs from the microcontroller. The figures provide logic flowcharts which chart the logic flow that governs the unit's intended method of operation.

Figure 5:
FIG. 5 is a schematic of the microcontroller, showing the microcontroller inputs on the left side of the figure, and the microcontroller outputs on the right.

FIG. 5 shows the microcontroller's inputs and outputs. Inputs from a ceramic resonator, a thermistor, a low voltage sensor and an on/off switch are provided to the microcontroller. The microcontroller, in turn, controls the three LEDs, the motor control, and the gas solenoid control.

A small, low cost microcontroller is preferred. An 8-bit CISC architecture is sufficient to meet the needs of the board, and a 16 to 20 pin controller will have enough I/O points. The microcontroller must have both a one-time programmable (OTP) version as well as a factory mask ROM version. The microcontroller needs to operate at a wide range of supply voltages, not just at 5V.

The microcontroller must have a low-power sleep mode. Since the firmware needs to do an orderly shutdown when the user indicates the unit is to be turned off, the on/off switch cannot remove power to the controller. Rather, the processor will need to perform shutdown tasks when it is to turn "off", and then enter a low-power sleep mode.

It is preferred that a low cost ceramic resonator be used rather than a more expensive crystal, since precise accuracy of timing functions is not critical.

An inexpensive thermistor is used to sense the temperature of the air being produced by the hairdryer. The microcontroller measures the resistance of the thermistor, and hence knows the temperature of the air, by charging and discharging a capacitor through the thermistor. Using a low-cost negative coefficient thermistor, cooler air will raise the thermistor resistance, resulting in a longer capacitor charge cycle. Warmer air will result in shorter capacitor charge cycles. The capacitor and thermistor are chosen such that the temperature is able to be measured at least once a second.

A catastrophic failure of the temperature measurement circuitry, including the thermistor itself, is detected when a shorter or longer than expected capacitor charge cycle is seen. For example, a shorted thermistor sensor wire will result in a very short charge cycle, and a broken wire to the thermistor will result in an infinitely long charge cycle.

The temperature sensing components are selected to balance cost with accuracy. As a result, the temperature sensing accuracy is roughly ±15° C. In addition, the design for the electronics provides that a separate thermal fuse is employed which will independently shut off the gas supply when a certain temperature is exceeded. The operation and state of the thermal fuse is transparent to the electronics and firmware.

Circuit components are chosen such that no special calibration is required. An external on/off switch turns the unit "on" and "off". The external switch cannot be momentary since it would then be impossible to know if the user is turning the unit on or off with each momentary switch closure. Since the firmware needs to be operational for a short time after the switch is set to the off position, the on/off switch is connected to an input to the processor rather than simply removing power to the board.

An on-board MOSFET transistor rated at 2A (continuous duty) switches power to an external DC brushed motor. There is no speed control; the motor either receives full battery power, or none at all. The on resistance of the MOSFET transistor is sized such that no more than 0.5V is dropped across the transistor, meaning that the motor will see a voltage of Vbat–0.5V.

An on-board MOSFET transistor rated at 250 mA (continuous duty) switches power to an external solenoid. The resistance of the MOSFET transistor is sized such that no more than 0.5V is dropped across the transistor, meaning that the solenoid will see a voltage of Vbat–0.5V.

The circuit is preferably run from 4 battery cells, either NiCads at 1.2V per cell, or regular alkaline batteries at 1.5V per cell. The total voltage to the board is between 4.8V to 6V with healthy batteries.

Since an orderly shutdown is desired when the batteries are weak, and since it is desirable to indicate to the user that the batteries are weak, a low voltage sensor will be used which turns off the fan motor and gas solenoid, if such a condition exists. The low-voltage threshold is set to 4.3V since it is just below the "knee" for dying NiCads, yet high enough to keep the electronics operational and to flash a "low voltage" LED.

The circuit board uses the three LEDs to convey to the user the current operating mode and the nature of any warnings or problems. The LEDs are turned on, off and flashed according to the following chart:

|        | Off              | On              | Flashing                                          |
|--------|------------------|-----------------|---------------------------------------------------|
| Green  | unit turned off  | unit turned on  | no ignition (ignition taking longer than 15 seconds) |
| Yellow | normal           | over temperature | ignition failure (ignition took longer than 30 seconds) |
| Red    | normal           | flame-out       | low battery                                       |

The firmware controls the operation of the hairdryer electronics. The flowcharts provided in FIGS. 6–10 detail the sequence of events in detail. As shown on the main flowchart page, the firmware runs through initialization at startup, and then executes ignition, run, and power down routines in sequence.

Figure 6:
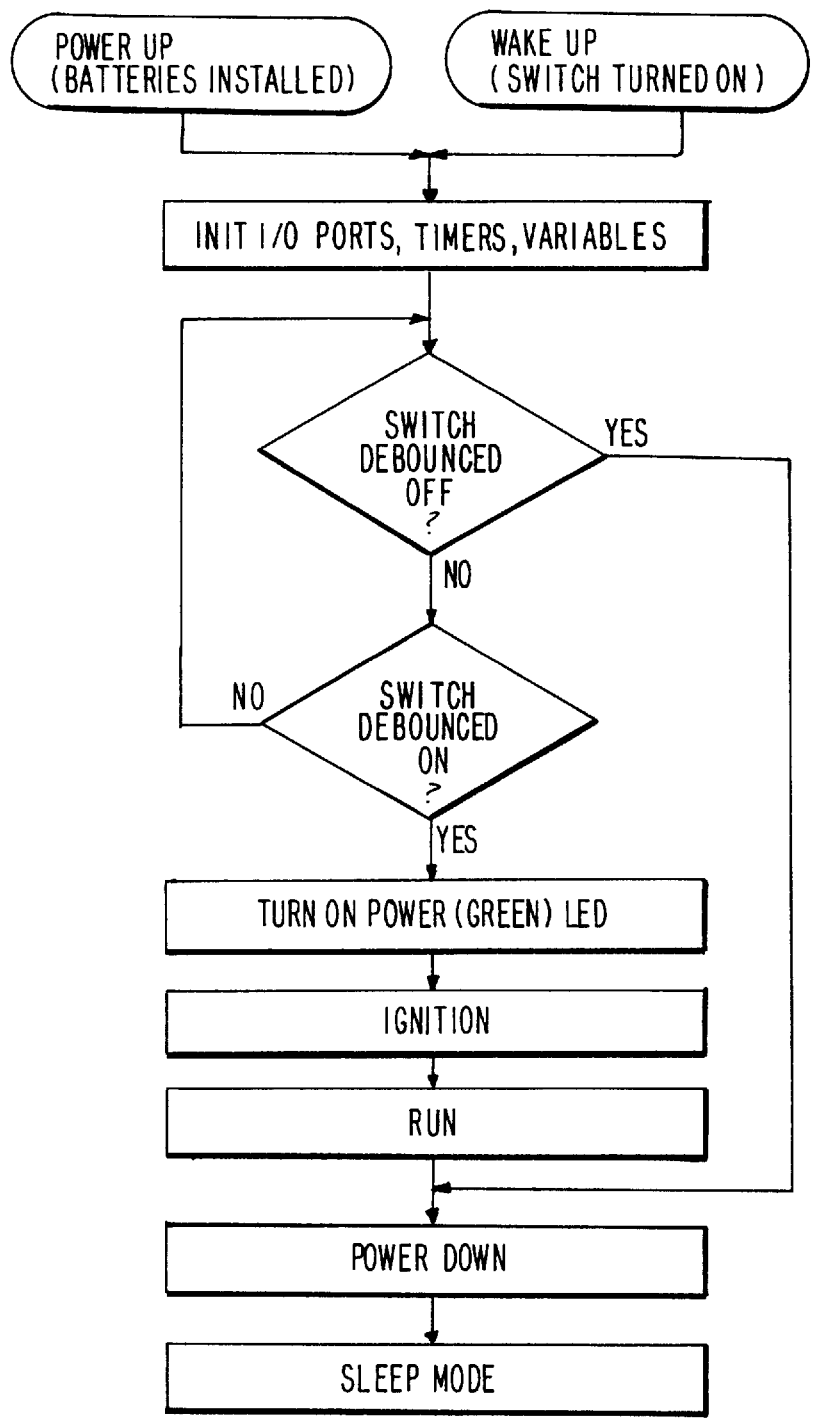
FIG. 6 is a logic flowchart providing an overview of the operation of the hairdryer.

As shown in FIG. 6, when woken up from its sleep mode (the on/off switch is turned on) or when power is applied (batteries are installed) the firmware runs through a setup or power-up routine. After certain variables and the timer are initialized and output ports are set to safe conditions, the on/off switch is debounced. If clearly set to "off", as can occur when batteries are installed, the firmware goes to the power-down routine. If the switch is clearly on, power is provided to the green LED which indicates to the user that the unit is in turned on, and then the ignition routine is entered.

Figure 7A:
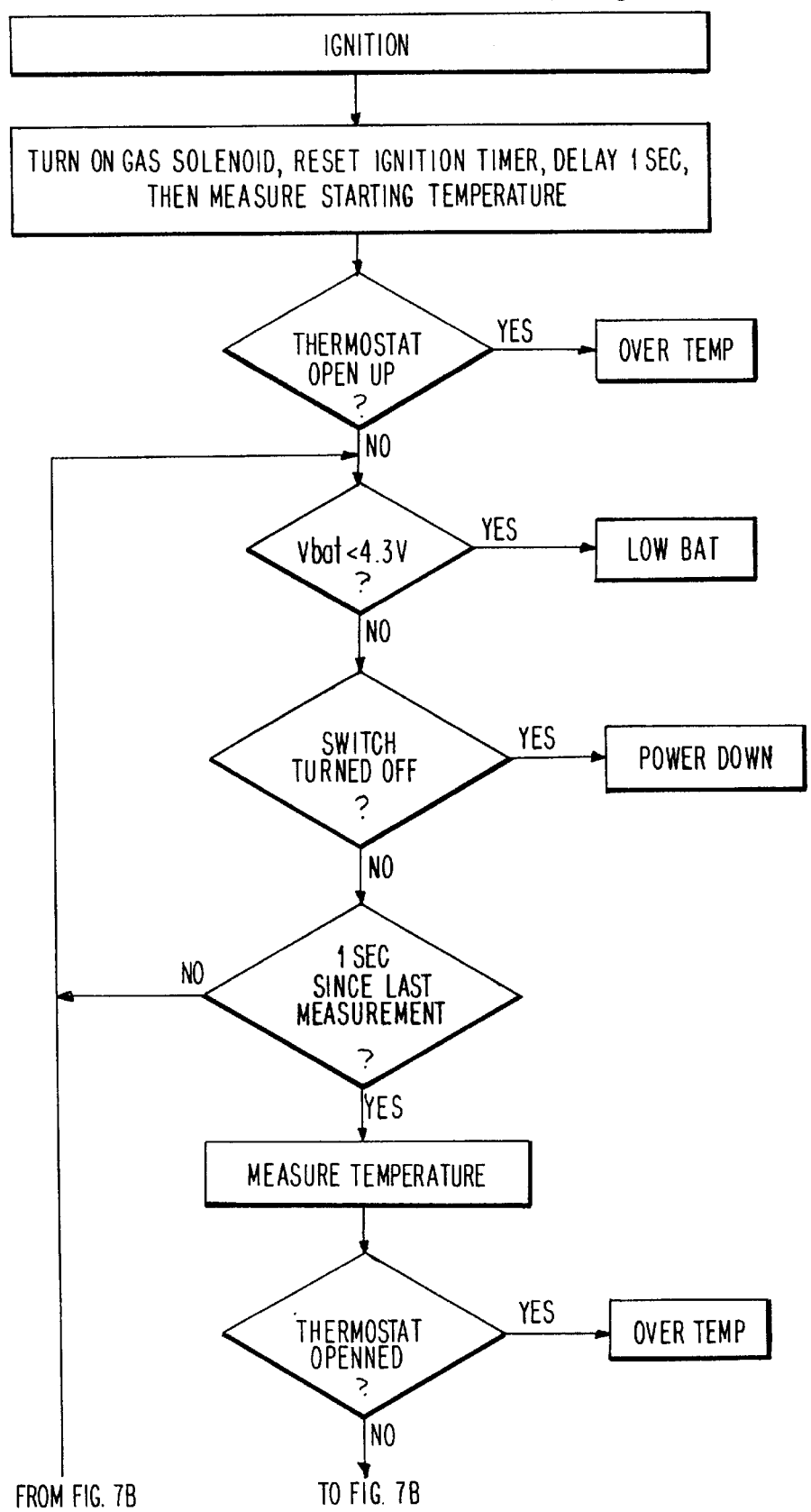
FIG. 7 is a logic flowchart of the ignition routine of the hairdryer, in accordance with the present invention.
Figure 7B:
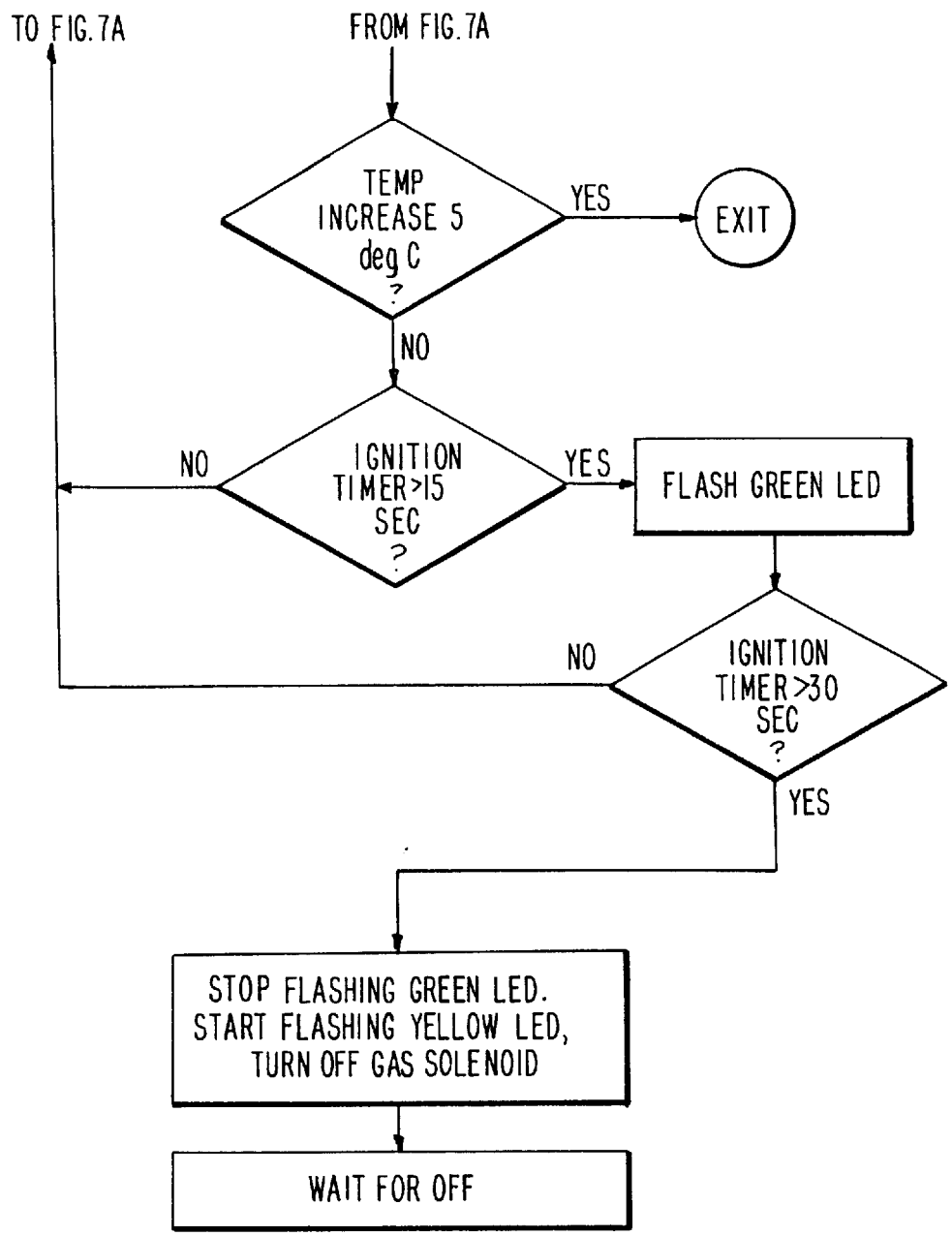

The ignition routine is diagrammed in FIG. 7. In the ignition routine, the gas is turned on, and the user is expected to ignite the flame by a mechanical switch. The flame is considered to be ignited when the thermistor increases by 5° C. If the ignition process takes more than 15 seconds, a warning green LED is flashed. If the process takes over 30 seconds, the gas is shut off and the user is notified (by a yellow flashing LED). All during this phase, if the thermistor heats up too much, the battery voltage drops below the low-voltage threshold, or the on/off switch is turned off, the appropriate routine is entered.

More specifically, in the ignition routine, the gas solenoid valve is opened, and the ignition timer is reset. A one second delay is effected, after which the unit measures starting temperature. The unit then monitors the mechanical thermostat to determine whether the thermostat is open. If so, an overtemperature signal is provided to the user.

If the thermostat is not open, the system checks the battery voltage. If a battery voltage below 4.3V is present, a low battery signal is illuminated (red flashing LED). The system then checks to determine whether the power switch has been toggled to deactivate the system. If so, the system enters the power down routine.

If the power switch, however, is still in the "on" position and less than one second has elapsed since the last measurement of temperature, the system rechecks the battery voltage and the status of the power switch. Once one second has elapsed, the system again measures the temperature. The unit again checks to determine whether the thermostat is opened. If so, the overtemperature signal is illuminated. If the thermostat is not opened, the system calculates whether the temperature has increased yet by five (5) degrees Celsius. If so, the ignition has been effected, and the system exits the ignition routine and enters the "run" mode.

If there has not yet been a temperature increase of five degrees Celsius, however, the system determines the amount of time which has elapsed since the ignition timer was reset. If less than fifteen (15) seconds have elapsed, battery voltage is checked, and the system reexecutes the series of steps leading to measurement of temperature. If more than fifteen (15) seconds have elapsed, the unit begins to flash the green LED. If the elapsed time is more than fifteen (15) seconds but less than thirty (30) seconds, the unit reexecutes the status checks and measures temperature again to determine whether there has been a temperature increase of five degrees. If a temperature increase of five degrees has been reached, the unit exits the ignition routine and enters run phase. This continues until a temperature increase of five degrees is reached or thirty seconds is reached, whichever occurs first.

If, upon reaching thirty seconds, ignition has still not been effected, the unit stops flashing the green LED, begins flashing the yellow LED, turns off the gas solenoid, and enters "wait for off" mode. This prevents undue buildup of unignited gas, which would provide an unsafe condition.

Once ignition has been effected, the unit enters the "run" phase. The run phase is diagrammed in FIG. 8. During the run phase, the flame is lit and the fan motor is running. In other words, the user is drying his or her hair. All during this phase, if the thermistor heats up too much, the battery voltage drops below the low-voltage threshold, or the on/off switch is turned off, the appropriate routine is entered. Additionally, during the run phase the temperature is monitored for a flameout condition. Flameout is determined one of two ways: 1) the temperature sensed by the thermistor drops below the temperature at which ignition was detected (5° C. above the temperature when the unit was turned on), or 2) the temperature exceeds 100° C. (as it normally does during the run phase) but then falls below 80° C.

Figure 8A:
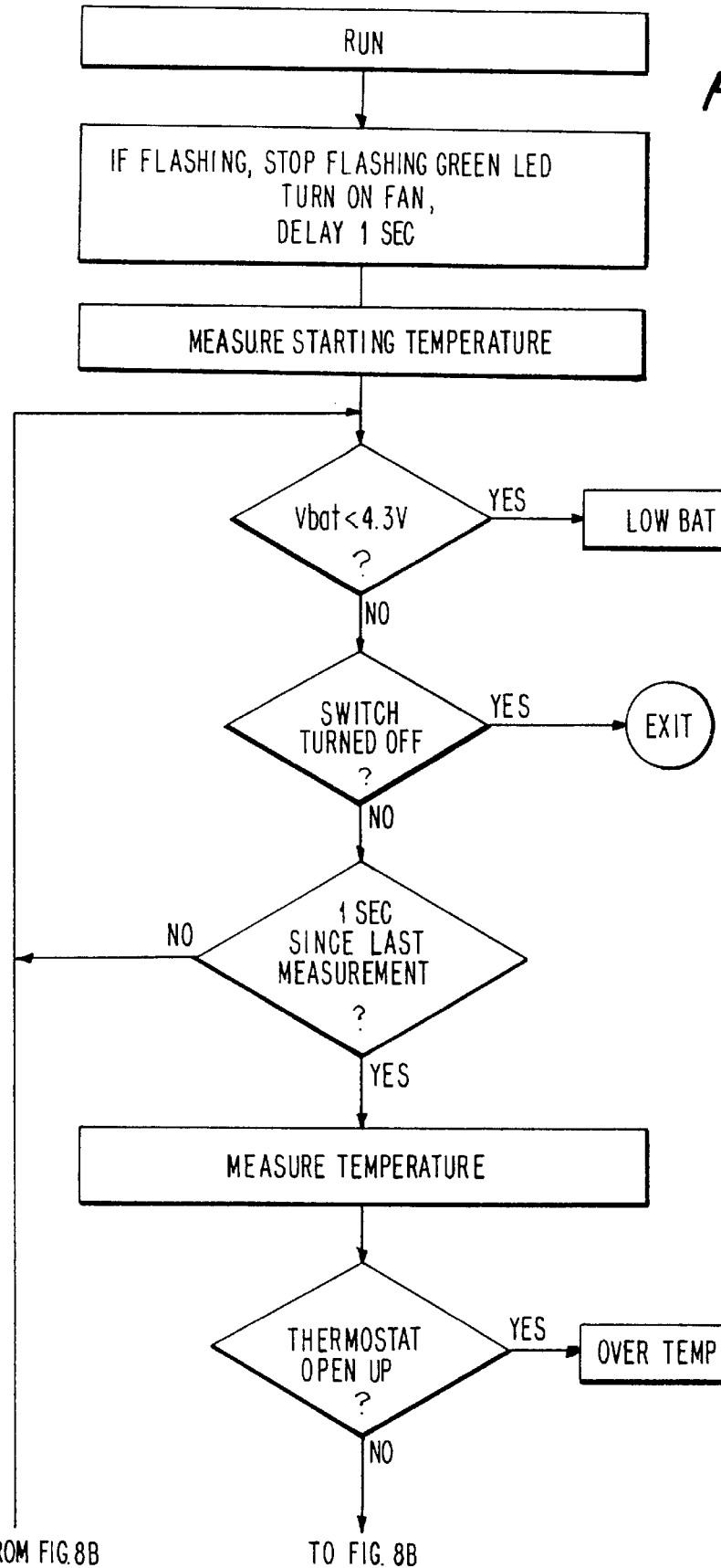
FIG. 8 is a logic flowchart of the present invention's "run" phase.
Figure 8B:
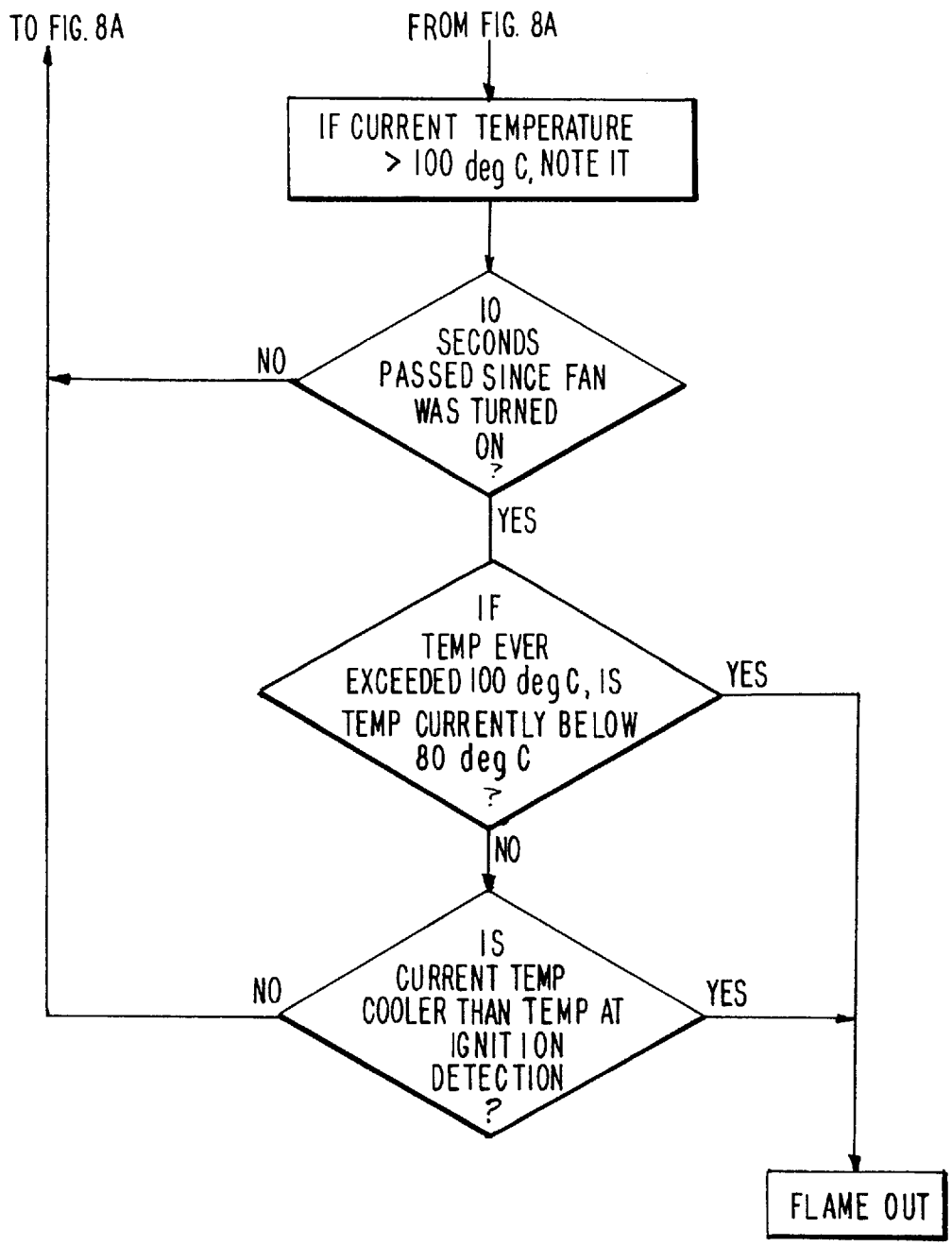
Figure 10A:
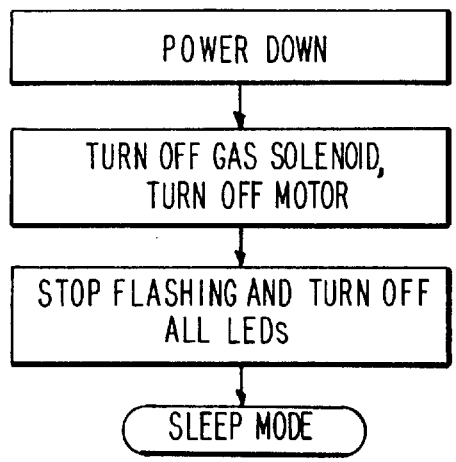
FIG. 10 shows logic flowcharts of the "power down" routine, the "low battery" routine, and the "overtemperature" routine, in accordance with the present invention.
Figure 10B:
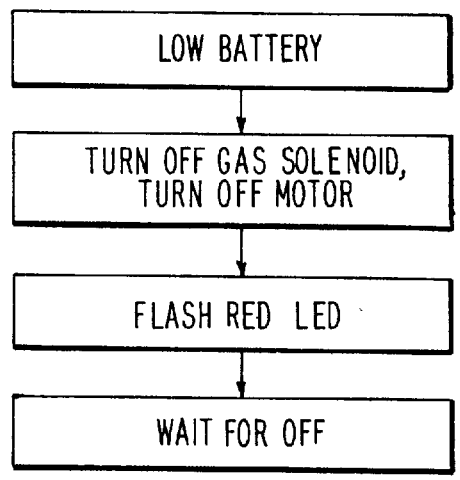
Figure 10C:
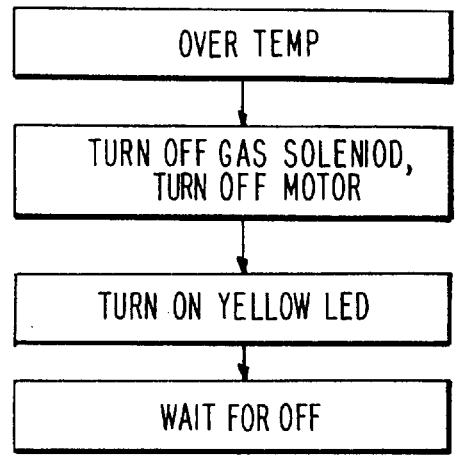

Thus, upon entering the run phase, if the green LED has been flashing, the unit stops the flashing of the LED and turns on the fan to blow air through the unit. Following activation of the fan, a one second delay is effected. The system then measures starting temperature approximately once each second, checks battery status and the status of the power switch in the ignition routine. If the mechanical thermostat is opened up, an overtemperature indicator is illuminated and the overtemperature routine is entered (as shown in FIG. 10). If not, the system continues through its cycle, as shown in FIG. 8.

At this point, the system saves a record in memory if the currently measured temperature exceeded 100 degrees Celsius. The system then calculates the amount of time which has elapsed since the fan was last turned on. If less than 10 seconds have elapsed, the system reexecutes the battery voltage and power switch checks, and its measurements of temperature and the condition of the thermostat. Upon return to this point, if more than 10 seconds have elapsed, the system checks the memory records to determine whether the temperature measurement has ever exceeded 100 degrees, and also whether the current temperature is below 80 degrees Celsius. If both of those conditions are present, the system enters the "flame-out" routine. If both of these conditions are not present, the system compares the currently measured temperature to the temperature at ignition detection. If the current temperature is not cooler than the ignition detection temperature, then the system reexecutes and returns to the point in the run phase where battery voltage is checked. If the current temperature, however, is cooler than the temperature at ignition detection, the system enters the flameout routine (shown in FIG. 9).

Figure 9A:
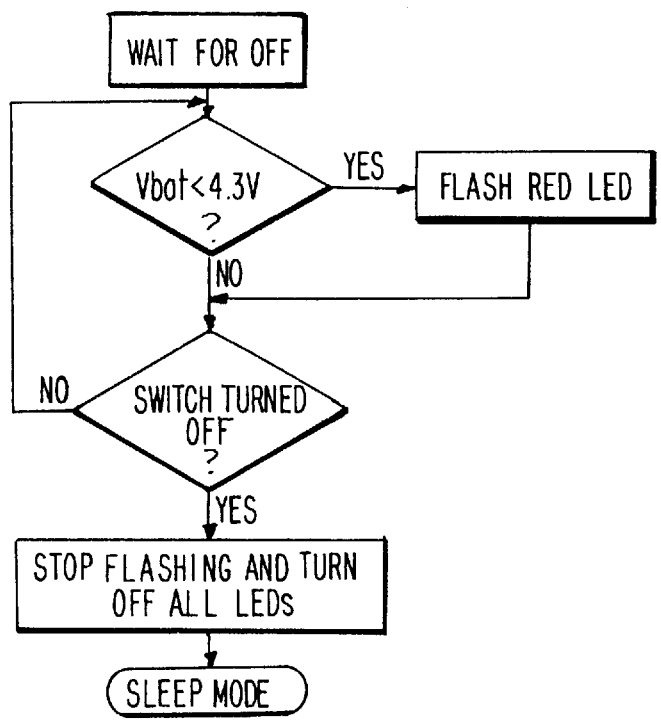
FIG. 9 shows logic flowcharts of the "wait for off" routine, and the "flameout" routine, in accordance with the present invention.
Figure 9B:
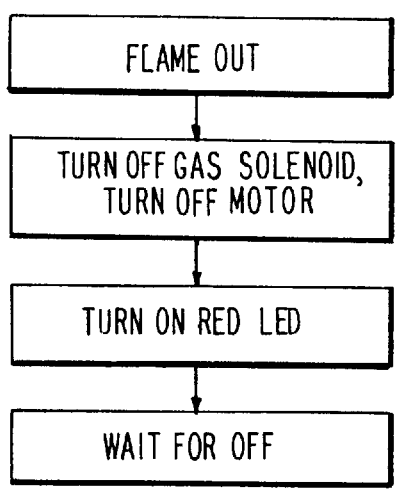

The "wait for off" routine is illustrated in FIG. 9. This routine is entered when a problem has occurred. Its purpose is to turn the fan and gas off, but keep the unit powered up in order to tell the user there was a problem via the visual indicator provided by the LEDs. When the user turns the unit off, all LEDs are turned off and the low-power sleep mode is entered.

The battery voltage is monitored during this routine as well. If, for example, this routine is entered because of a flameout, the low voltage warning will be shown in addition to the flameout warning, if such a condition should occur.

Thus in this routine, the system monitors the battery voltage and waits for the user to turn the system off. Specifically, the system checks the battery voltage to determine whether it has fallen below 4.3 volts. If not, the system will continue to monitor battery voltage while it waits for the switch to be turned off. If the battery voltage has, in fact, fallen below 4.3 volts, the system flashes a red LED to signal to the user the presence of a low battery condition. This red LED signal will continue to flash as long as the voltage remains below 4.3 volts, until the power switch is turned off. Once the power switch has been turned off by the user, all LEDs are turned off, and the unit enters sleep mode. In sleep mode there is no electrical activity and the unit waits until activation by a user.

The flame out routine is also illustrated in FIG. 9. In this routine, both the gas solenoid and the unit's motor are turned off. The red LED is then illuminated to provide a steady red glow, signalling to the user that a flame out has occurred. The system then enters the "wait for off" routine described above.

The power down routine is illustrated in FIG. 10. This routine is entered when the user hits the power switch to turn the unit off. In the power down routine, the system turns off the gas solenoid and the motor running the fan. It then stops any LEDs from flashing, and turns all LEDs off. The system then enters the low power sleep mode, awaiting activation by a user.

The low battery routine is illustrated in FIG. 10 as well. This routine is entered when a low battery condition (i.e. a voltage of under 4.3 volts) is detected by the system. In the low battery routine, the system turns off the gas solenoid and the motor. It then illuminates the red LED to signal to the user that battery power is low. The system then enters the "wait for off" routine described above.

The overtemperature routine is also illustrated in FIG. 10. This routine is entered when an overtemperature condition is detected by the mechanical thermostat. In the overtemperature routine, the system turns off the gas solenoid and the motor, and turns on the yellow LED to signal to the user that an overtemperature condition has been detected. The system then enters into the "wait for off routine" waiting for the user to turn the unit off.

Having described this invention with regard to specific embodiments, it is to be understood that the description is not meant as a limitation since further variations or modifications may be apparent or may suggest themselves to those skilled in the art. It is intended that the present application cover such variations and modifications as fall within the scope of the appended claims.

We claim:

1. A cordless, fuel heated hairdryer, comprising:
   a combustion area, said combustion area being a compartment in said hairdryer in which fuel is combusted to provide heat to air flowing through and out of said hairdryer;
   a fuel source, said fuel source holding a hydrocarbon fuel for delivery to said combustion area;
   a power source, said power source providing electricity to said hairdryer;
   at least two valves, said valves controlling the flow of said fuel from said fuel source to said combustion area, said valves comprising a mechanical valve and an electrical valve, said electrical valve being a valve which remains in a closed position unless a predetermined amount of electricity from said power source is supplied thereto, and wherein said fuel can only be delivered from said fuel source to said combustion area when both of said valves are open.

2. A hairdryer as claimed in claim 1, wherein said electrical valve is a solenoid valve which remains in a closed position unless a predetermined amount of voltage is supplied thereto.

3. A hairdryer as claimed in claim 2, wherein said mechanical valve further comprises a pressure regulator for regulating the levels of fuel delivered from said fuel source to said combustion area.

4. A hairdryer as claimed in claim 2, wherein said hairdryer is provided with a microcontroller, said microcontroller controlling the voltage provided to said solenoid valve.

5. A hairdryer as claimed in claim 4, wherein said hairdryer is further provided with temperature sensing means for sensing the temperature in said combustion area, said microcontroller monitoring said sensing means, and controlling said voltage to said solenoid valve based upon a predetermined program.

6. A hairdryer as claimed in claim 5, wherein said hairdryer further comprises a fan, said fan drawing air into the back of said hairdryer and blowing said air out of the front of said hairdryer, said fan being powered by a motor, said motor being powered by said power source, said microcontroller controlling the power to said fan motor based upon a predetermined program.

7. A hairdryer as claimed in claim 4, wherein said hairdryer further comprises low voltage sensing means, said low voltage sensing means detecting when the voltage supplied by said power source dips below a predetermined voltage level.

8. A hairdryer as claimed in claim 5, wherein said temperature sensing means comprise a thermistor.

9. A hairdryer as claimed in claim 8, wherein said temperature sensing means further comprise a mechanical thermostat.

10. A hairdryer as claimed in claim 7, wherein said hairdryer further comprises a switch, both said mechanical valve and said solenoid valve being activatable by said switch.

11. A hairdryer as claimed in claim 10, wherein said hairdryer further comprises a piezoelectric ignitor in said combustion area to ignite said fuel in said combustion area.

12. A hairdryer as claimed in claim 11, wherein said microcontroller controls the electricity provided to said solenoid valve and said fan motor.

13. A hairdryer as claimed in claim 12, wherein said power source comprises rechargeable batteries.

14. A hairdryer as claimed in claim 13, wherein said hairdryer is provided with LEDs for signalling the internal status of said hairdryer.

15. A hairdryer as claimed in claim 14, wherein said internal status comprise the power status, the ignition status, and the battery voltage status.

16. A hairdryer as claimed in claim 1, wherein said hydrocarbon fuel comprises butane.

17. A cordless, fuel heated hairdryer, comprising:

a combustion area, said combustion area being a compartment in said hairdryer in which fuel is combusted to provide heat to air flowing through and out of said hairdryer;

a fuel source, said fuel source holding a hydrocarbon fuel for delivery to said combustion area;

at least one temperature sensing means for sensing the temperature in said combustion area;

a power source, said power source providing electricity to said hairdryer;

at least two valves, said valves controlling the flow of said fuel from said fuel source to said combustion area such that both of said valves must be open for fuel to flow from said fuel source to said combustion area, said valves comprising a mechanical valve and a solenoid valve, said solenoid valve being in a closed state preventing the flow of fuel therethrough unless a predetermined amount of voltage is applied to said solenoid valve; and, a microcontroller, said microcontroller controlling the electricity supplied to said solenoid valve based upon predetermined parameters.

18. A cordless, fuel heated hairdryer, comprising:

a combustion area, said combustion area being a compartment in said hairdryer in which fuel is combusted to provide heat to air flowing through and out of said hairdryer;

a fuel source, said fuel source holding a hydrocarbon fuel for delivery to said combustion area;

a power source, said power source providing electricity to said hairdryer;

at least two valves, said valves controlling the flow of said fuel from said fuel source to said combustion area such that both of said valves must be open for fuel to flow from said fuel source to said combustion area, said valves comprising a mechanical valve and a solenoid valve, said solenoid valve being in a closed state preventing the flow of fuel therethrough unless a predetermined amount of voltage is applied to said solenoid valve;

a fan for drawing air into and blowing said air out of said hairdryer, said fan being driven by a fan motor, said fan motor being powered by said power source; and, a microcontroller, said microcontroller controlling the electricity supplied to said solenoid valve and said fan motor.

19. A cordless, fuel heated hairdryer, comprising:

a combustion area, said combustion area being a compartment in said hairdryer in which fuel is combusted to provide heat to air flowing through and out of said hairdryer;

a fuel source, said fuel source holding a hydrocarbon fuel for delivery to said combustion area;

at least one temperature sensing means for sensing a temperature in said hairdryer;

a power source, said power source providing electricity to said hairdryer, at least two valves, said valves controlling the flow of said fuel from said fuel source to said combustion area such that both of said valves must be open for fuel to flow from said fuel source to said combustion area, said valves comprising a mechanical valve and a solenoid valve; and a microcontroller, said microcontroller controlling the electricity supplied to said solenoid valve based upon predetermined parameters.

* * * * *